United States Patent [19]
Jones, Jr.

[11] 4,084,325
[45] Apr. 18, 1978

[54] CENTER FINDER

[76] Inventor: Hiram Jones, Jr., R.D. No. 1, Box 130B, Ellwood City, Pa. 16117

[21] Appl. No.: 677,080

[22] Filed: Apr. 15, 1976

[51] Int. Cl.² .......................... B25B 5/02; B25D 5/00
[52] U.S. Cl. ..................................................... 33/191
[58] Field of Search .................... 33/191, 189, 169 C, 33/194, 174 G

[56] References Cited
U.S. PATENT DOCUMENTS

| | | | |
|---|---|---|---|
| 1,309,654 | 7/1919 | Parks ..................................... | 33/191 |
| 1,373,367 | 3/1921 | Summers ............................... | 33/191 |
| 2,543,026 | 2/1951 | Jennings ................................ | 33/191 |

*Primary Examiner*—Richard E. Aegerter
*Assistant Examiner*—Willis Little
*Attorney, Agent, or Firm*—Parmelee, Miller, Welsh & Kratz

[57] ABSTRACT

A center finding assembly is shown having a pair of longitudinally extending arms which at their ends carry a pair of edge-engaging, angle-shaped end guides that are adjustable with respect to each other longitudinally therealong. The pair of end guides of each arm are adapted to engage and to be secured between opposite edge portions of a substantially symmetrical workpiece to provide an automatic centering of a spool-like indicator element that is slidably pivotally carried by and that cross-connects the arms. The end guides are adapted to receive in an interfitting complementary relation a secondary pair of guides for adapting the assembly to the centering of a circular workpiece. Where measurements are to be taken from the located center, a protractor assembly is adapted to interfit with the indicator element and is provided with secondary arms and cooperating slide guides for accurately aligning it with respect to the workpiece. The protractor has graduated open portions therealong for locating desired distances from the center of the workpiece.

6 Claims, 8 Drawing Figures

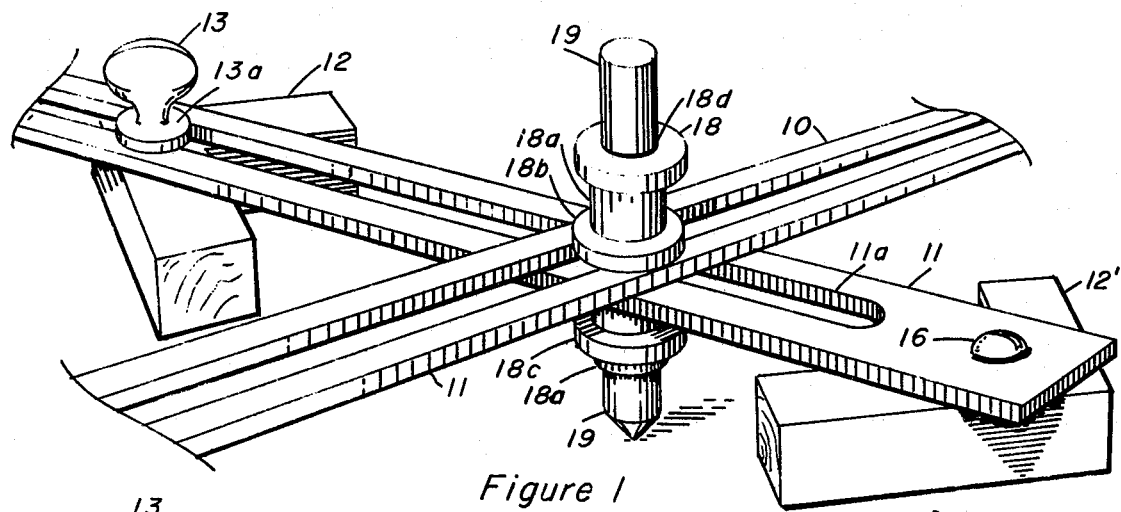
Figure 1
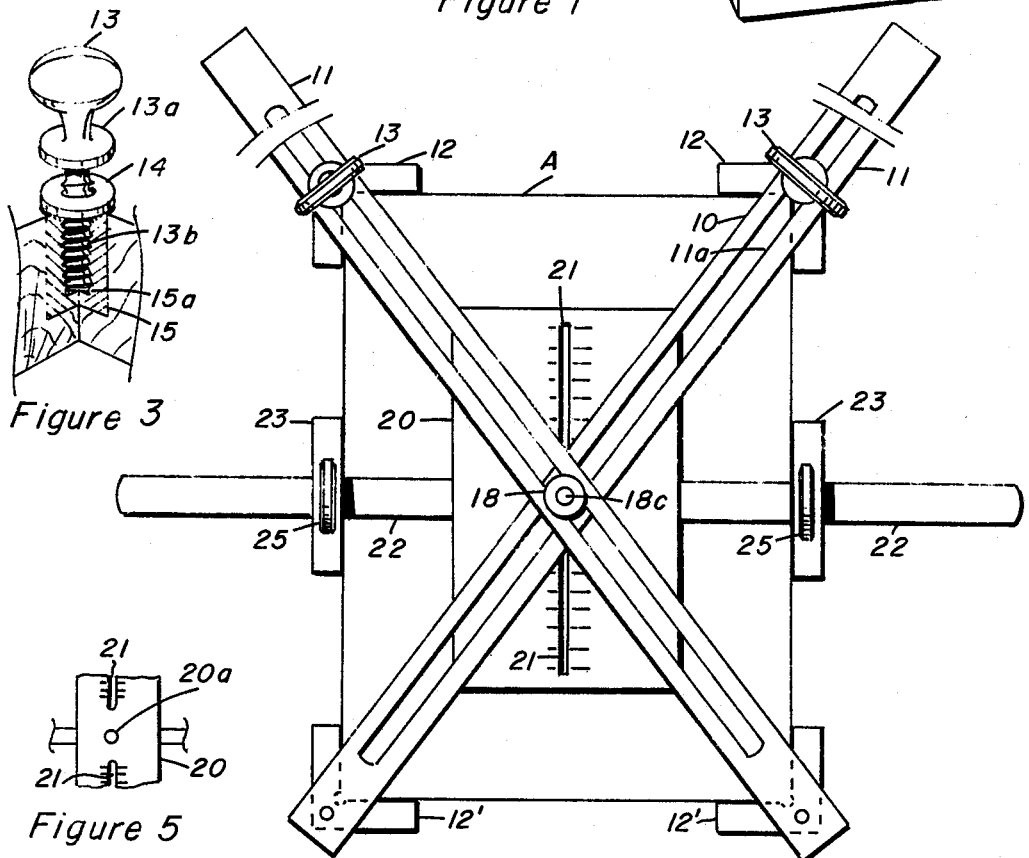
Figure 3
Figure 5
Figure 2
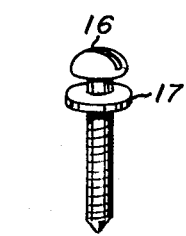
Figure 4
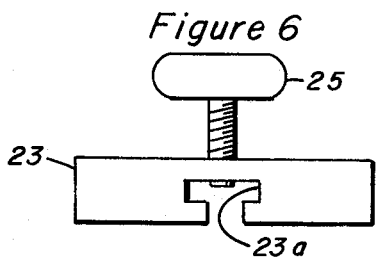
Figure 6

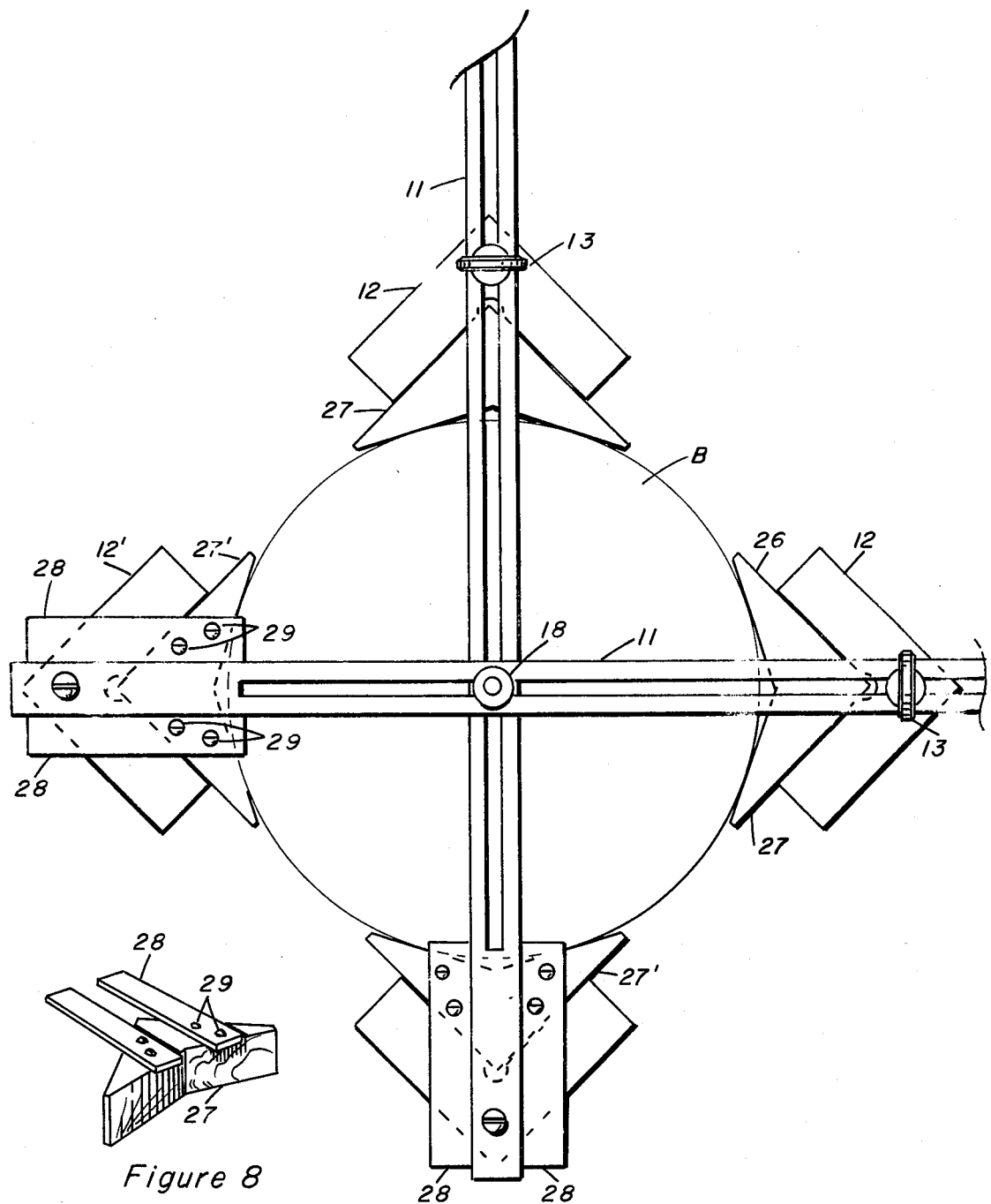

CENTER FINDER

BACKGROUND OF THE INVENTION

1. Field of the Invention

This invention relates to an improved two arm, center finding device for a workpiece and particularly, to a center finder that may be easily, accurately positioned on and secured over the face of a workpiece. A phase of the invention deals with a device that may be used for finding the center of rectangular, square as well as circular workpieces. Another phase of the invention relates to a protractor that may be used with the center finder device for accurately determining other work points on the face of the workpiece.

2. Description of the Prior Art

There have been many and some rather complex devices for finding the center of circular workpieces, but there is a need for a device of relatively simple construction that can be positioned to locate the center of other symmetrical workpieces, such as those of square or rectangular shape. Also, the device should be capable of being retained in a center locating position in such a manner as to fully free the hands of the worker, and capable of use with a protractor for accurately making center-aligned, other work point or position designations on or with respect to a face of the workpiece.

SUMMARY OF THE INVENTION

It has thus been an object of the invention to devise an improved center locating device which is adaptable to circular as well as rectangular or square edged, substantially symmetrical workpieces.

Another object has been to develop a relatively simple and inexpensive but fully practical center finding device or assembly that is readily adaptable through the agency of a pair of cross-connected arms for finding the center on the face of a workpiece by cooperating with opposite edge portions thereof.

A further object has been to meet the need for a relatively simple, highly accurate device for movement into a center locating position with respect to the face of an angle-shaped as well as a circular shaped workpiece, and that may be securely retained in such a position in such a manner as to free the hands of the worker.

A still further object of the invention has been a device that will enable the interchangeable use of a protractor to accurately on a located center, find additional points or positions as determined from the protractor.

These and other objects of the invention will appear to those skilled in the art from the illustrated embodiment and the claims.

BRIEF DESCRIPTION OF THE DRAWINGS

In the drawings,

FIG. 1 is a perspective view in elevation showing a centering device embodying the invention;

FIG. 2 is a top plan view on a reduced scale of the device of FIG. 1;

FIG. 3 is a vertical view in partial section on the scale of FIG. 1 showing details of the construction and mounting of one end guide element of each arm of the device of FIGS. 1 and 2;

FIG. 4 is a vertical view on the scale of FIG. 3 showing means for mounting the other end guide element on an associated arm of the device of FIGS. 1 and 2;

FIG. 5 is a reduced fragmental top plan showing details of the construction of a protractor shown in utilization in FIG. 2;

FIG. 6 is a greatly enlarged end view in elevation showing details of the construction of secondary sliders or guides that as indicated in FIG. 2, may be positioned on secondary arms that extend from a protractor;

FIG. 7 is a top plan view on the scale of FIG. 2 showing the center finder device or assembly of FIGS. 1 and 2 as adapted for locating the center of a circular workpiece; and FIG. 8 is a fragmental perspective detail showing the construction of one of a pair of secondary end guides that are adapted to be used with the primary end guides of FIG. 2 for gauging a circular workpiece.

DESCRIPTION OF THE PREFERRED EMBODIMENT

In carrying out the invention, a center finding device or assembly 10 embodying the invention is shown having a primary construction, as illustrated in FIGS. 1 and 2. A pair of similar, longitudinally extending gauging arm members 11 are carried in an adjustably pivoted and slidable, cross-extending relation with respect to each other by a spool-like center indicator element 18. The indicator 18 has a hollow or sleeve-like shaft portion 18a, and a pair of vertically spaced-apart, cooperating guide rim or flange portions 18b and 18c that are adapted to cross-connect and slidably, pivotally engage crossing outer sides of the pair of arm members 11. As shown, the shaft 18a extends through closed-end, longitudinal slot portions 11a of the arms, and is provided with a rim or flange 18d at its upper end which surmounts a through-extending, hollow bore 18d for marking the center on an adjacent substantially planar face of a workpiece A (or B). The shaft 18 is adapted to bypass a pencil or punch 19 through its bore 18d (see FIG. 1).

One end of each gauging arm 11 is secured, as shown in FIGS. 1 and 4, in a pivotal relation with respect to one edge-engaging, end guide element 12' by a screw 16 and an under-positioned washer 17. The other or opposite end portion of each arm 11 has, as shown particularly in FIGS. 1, 2 and 3, a latching thumbscrew 13 that slidably-pivotally carries an opposite, edge-engaging, end guide element 12 in a suspended relation therefrom. The latching thumbscrew 13 is shown adjustably secured within a wear plug 15 in such a manner that its male threaded stem 13b will cooperate with a female threaded bore portion 15a of the wear plug to raise and lower an upper abutment or clamping flange portion 13a with respect to the associated pair of arms 11, and also with respect to an under-positioned washer 14. Thus, the thumbscrew 13 may be tightened-down to lock the end guide elements 12 and 12' of the pair of arms 11 at a suitable center found position, to tightly secure them in position, as at opposite corners of a rectangular workpiece, such as shown in FIG. 2. In this manner the device 10 may be retained in a center-locating position over the face of a workpiece. Each guide of the pair of end guides 12 and 12' has an open concave or angular side defined by its legs, which is shown as a right angular relation to provide a complementary corner-engaging position, where a rectangular or square workpiece is to be center-located.

On the other hand, when the center of a circular workpiece B, shown in FIG. 7, is to be found, the assembly of FIG. 1 may be used directly or preferably used with a pair of secondary end guide elements 27 and 27'. It will be noted that the secondary end guides 27 and 27' have an outer right-angular relation so as to have a complementary, interfitted, fitted relation within the end guides 12 and 12'. To more closely conform to the circular shape B, the included or inner edges of the secondary end guides 27 and 27' are shown provided with a much greater included angular shape, such as to define a 140° included angle. This angular relation thus approaches a close tangential relation with respect to the round edges of the workpiece B to provide two widened points of contact for each guide element.

To give stability to the assembly, one secondary end guide element 27' may, as shown in FIGS. 7 and 8, be provided with a pair of transversely spaced-apart longitudinally extending side guide strap-like pieces or arms 28 which are secured on its upper face by screws 29. As indicated, the side guide pieces 28 are adapted to engage longitudinal side edges of the associated arm 11 to enable the guide 27 to slidably fit on the end of an associated arm 11 and by its complementary fit within the guide 12', retain the latter in an aligned position with respect to the arm 11. As in the usage of FIG. 2, the usage of FIG. 7 may be accomplished to secure the device 10 in a center finding position by tightening-down the thumbscrews 13 of the primary end guide 12 of each arm 11. The workman thus has free use of his hands.

It will be noted that in both utilizations of the device 10, adjacent extending portions of the arm members 11 define opposite equal angles, but in the utilization of FIG. 2, the arms 11 have a diagonal cross-extending relation, while in the utilization of FIG. 7, they have a substantially right angular relation. As thus used, the workman is assured of accurately locating the center on the face of a workpiece A or B, and may indicate it by, for example, striking the pin 19 with the head of a hammer. In the relations of both FIGS. 2 and 7, the outer end portions of the arm 11 define outwardly open angle-shaped spaces between their adjacent end portions.

To further the utilization of the device 10, a protractor 20 is shown which has a main plate-like body member that has a center hole 20a therein adapted to fit in a close, complementary, slidable on and off fitted relation on the lower portion 18a of the shaft of the indicator 18. This assures that the protractor 20 is centered. For accurately extending measurements from the center, the protractor 20 is provided with a pair of strap-like secondary arms 22 which integrally project from opposite sides thereof to cooperate with opposite side edges of the workpiece A. Each secondary arm 22 is provided with a locking slide element or slider 23 (see FIG. 6) which has a U-shaped under-open, slide guide slot 23a. A screw 25 having an enlarged head extends upwardly from each slider 23 and is adapted to securely lock the arm members 22 in a tight engaging relation between opposite side edges of the workpiece A.

In the position shown in FIG. 2, the protractor 20 may be used to mark-off aligned points from the center point which may be accurately determined from graduations along its two closed-end, aligned slot portions 21 (see also FIG. 5). For example, if the front of a desk or dresser drawer is to be marked for the mounting of a two prong drawer pull having, for example, a three-inch spacing between its prongs, then one and one-half inches from each side of the center may be indicated by inserting a pencil or punch in the slot portions 21. Thus, additional markings may be provided by the protractor 20 that are accurate from the standpoint of a center-located position of the workpiece.

I claim:

1. In an improved center-finding assembly for accurately locating the center of a workpiece of substantially symmetrical shape, a pair of longitudinal gauging arm members, a center-seeking indicator of spool-like shape cross-connecting said pair of arm members together in a slidable-pivotal relation with respect to each other, a pair of edge-engaging guide elements for each of said arm members, one guide element for each said arm member being pivotally non-slidably mounted thereon adjacent one end thereof, the other guide element for each said arm member being a slide guide element pivotally and endwise-adjustably mounted thereon adjacent the opposite end thereof for relative movement into and out of a substantially complementary engagement against an edge portion of the workpiece that is opposite to the edge portion thereof that is being engaged by said one guide element, said indicator permitting said pair of arm members to be adjusted as to their cross-extending angular relationship with respect to each other and being automatically slidable into a centering position with respect to a face of the workpiece when said pair of guide elements of each of said arm members are moved into opposite edge-engaging positions with respect to the workpiece, said pair of guide elements for each of said arms having an open concave-shaped side for aligned engagement with opposed edges of the workpiece, said pair of arm members in their mounted center-locating positioning defining opposite pairs of open angle-shaped spaces therebetween of the same angular relation with respect to each other, a plate-like protractor having central mounting means for positioning it on and with respect to said center indicator, said protractor having slot portions therealong in an aligned and outwardly extending relation from said central mounting means, and graduations along said slot portions for determining points therealong of selected distance from a center point determined by said indicator.

2. In an improved center-finding assembly for accurately locating the center of a workpiece of substantially symmetrical shape, a pair of longitudinal gauging arm members, a center-seeking indicator of spool-like shape cross-connecting said pair of arm members together in a slidable-pivotal relation with respect to each other, a pair of edge-engaging guide elements for each of said arm members, one guide element for each said arm member being pivotally non-slidably mounted thereon adjacent one end thereof, the other guide element for each said arm member being a slide guide element pivotally and endwise-adjustably mounted thereon adjacent the opposite end thereof for relative movement into and out of a substantially complementary engagement against an edge portion of the workpiece that is opposite to the edge portion thereof that is being engaged by said one guide element, said indicator permitting said pair of arm members to be adjusted as to their cross-extending angular relationship with respect to each other and being automatically slidable into a centering position with respect to a face of the workpiece when said pair of guide elements of each of said arm members are moved into opposite edge-engaging positions with respect to the workpiece, said pair of guide elements for each of said arms having an open concave-shaped side for aligned engagement with opposed edges of the workpiece, said pair of arm members in their mounted center-locating positioning defining opposite pairs of open angle-shaped spaces therebetween of the same angular relation with respect to each other, a protractor having means for positioning it in a centered position on and with respect to said center indicator, means associated with said protractor for accurately aligning it between said arm members and with respect to opposite side edges of the workpiece, said last-mentioned means being a pair of secondary arm members projecting in opposite directions therefrom across the workpiece, and a slider carried by each of said secondary arms for engaging opposite side edges of the workpiece.

3. In an improved center-finding assembly as defined in claim 2, each of said sliders having means for locking it in an adjusted position on its associated said secondary arm for positioning said protractor in a secure side-edge engaging relation with respect to the workpiece.

4. In an improved center-finding assembly as defined in claim 3, said center indicator having a through-extending shaft, said protractor having a central plate and said means for positioning said protractor with respect to said center indicator being a hole portion in said central plate adapted to fit in a complementary relation on an under-portion of said shaft.

5. In an improved center-finding assembly as defined in claim 4, said shaft of said center indicator having a center bore therethrough to by-pass a center marking means therethrough.

6. In an improved center-finding assembly for a workpiece of substantially symmetrical shape, a pair of longitudinally extending primary gauge arms, each of said primary arms having an elongated slot portion extending substantially centrally therealong, a center indicator slidably mounted to connect said pair of primary arms in an adjustably pivoted relation along their slot portions with respect to each other, a pair of angle-shaped primary guides for each of said primary arms, one primary guide of each said pair being an end guide pivotally secured to project from one end of the associated said primary arm, the other guide of each said pair being a slide guide slidably mounted thereon for movement along the slot portion of the associated said primary arm towards and away from said one end guide, each said slide guide being adapted to move along its associated said primary arm into engagement with the edge of the workpiece to be gauged to size the workpiece between said slide and said end guides of each same primary arm in such a manner that said indicator will be moved to a center-locating position on the face of the workpiece, a locking element cooperating with each said slide guide for securing it in an edge-clamping position with respect to the workpiece, whereby the workpiece is gripped along its edges between said pair of guides of said primary arms, a template having a central hole portion adapted to fit on an under portion on said center indicator to extend substantially centrally across within opposite spacing defined by said pair of primary arms when said indicator is positioned in a centered position on the face of the workpiece, said template having aligned indicating means extending from adjacent said indicator to locate desired distances from the center of the workpiece, said template having a pair of oppositely extending secondary arms, and an adjustable slide block on each of said secondary arms adapted to move therealong for engaging opposite edges of the workpiece at substantially intermediate positions thereon.

* * * * *